United States Patent [19]

Clark

[11] 4,434,198

[45] Feb. 28, 1984

[54] DUPLICATING STENCIL

[75] Inventor: Leslie Clark, New Castle upon Tyne, England

[73] Assignee: Roneo Alcatel Limited, Romford, England

[21] Appl. No.: 314,725

[22] Filed: Oct. 26, 1981

Related U.S. Application Data

[60] Division of Ser. No. 120,513, Feb. 11, 1980, Pat. No. 4,351,685, which is a continuation of Ser. No. 929,467, Jul. 31, 1978, abandoned.

[30] Foreign Application Priority Data

Aug. 1, 1977 [GB] United Kingdom ............... 32243/77

[51] Int. Cl.$^{3}$ ...................... B32B 31/00; D21F 11/00; B41L 11/06; B05D 5/06

[52] U.S. Cl. .................................. 428/43; 428/311.3; 428/319.7; 430/49; 427/143; 101/128.21

[58] Field of Search ................ 101/128.21, 128.4, 129, 101/128.3; 430/DIG. 13, 33, 49, 964, 308; 427/143; 156/234, 247, 249, 289, 231, 239, 235; 493/953, 335, 334, 330, 328; 162/133, 181 B; 428/43, 242, 304, 911, 311.3, 317.1, 319.1, 319.3, 319.7, 319.9, 323

[56] References Cited

U.S. PATENT DOCUMENTS

| | | | |
|---|---|---|---|
| 2,539,755 | 1/1951 | Rogers et al. | 493/953 |
| 2,949,848 | 8/1960 | Mott | 101/128.3 |
| 2,955,531 | 10/1960 | Bogdonoff | 427/143 |
| 3,322,594 | 5/1967 | Lucas et al. | 156/247 |
| 3,871,899 | 3/1975 | Andersen | 101/128.4 |

FOREIGN PATENT DOCUMENTS 1567263 4/1969 France .

OTHER PUBLICATIONS

Chem. Abstr., vol. 72, #14026m, Antiadhesive Paper Coatings, Heukel et al.

*Primary Examiner*—Edward C. Kimlin
*Assistant Examiner*—Louis Falasco
*Attorney, Agent, or Firm*—Robert T. Gammons

[57] ABSTRACT

A duplicating stencil is produced by placing an electrostatically-produced image on a substrate in contact with an ink-impervious surface layer of a stencil blank, bending the image to the surface layer by the application of heat and/or pressure and stripping the substrate from the stencil blank to remove the surface layer in the image area. The surface layer may comprise a synthetic resin composition containing a finely dispersed pigment and is attached to the porous base tissue of the stencil blank by an adhesive. Bonding of the image to the surface layer and possibly also fixing of the image to the substrate in the same operation can be effected by means of infra-red heating.

4 Claims, 4 Drawing Figures

DUPLICATING STENCIL

This is a division of application Ser. No. 120,513 now U.S. Pat. No. 4,351,685 filed Feb. 11, 1980, which is a continuation of Ser. No. 929,467, filed July 31, 1978 abandoned.

This invention relates to the preparation of stencils for use on a stencil duplicator for reproduction purposes.

The principle of stencil duplicating is a long established art which involves the use of an impermeable stencil which is perforated or cut in areas corresponding to an image required to be duplicated so that when the stencil is used on a duplicator machine ink passes through the holes in the stencil and produces duplicate images on the copy paper employed.

There are at the present time two commercial systems suitable for the non-manual production of stencils. The first process involves the electrical cutting of a carbonloaded layer on a porous stencil sheet. A spark discharge cutting-head is synchronised with an optical head which views the original and directs the cutting-head to cut the stencil, point by point. This system produces good results but is relatively slow, requiring a period of 5 to 15 minutes to complete, and since the process involves buring off the carbon loaded regions it is dirty and produces an unpleasant odour.

The second process is referred to as "thermal imaging" and involves placing a thin plastic coated porous stencil over the face of the original document to be copied, the stencil and copy being then subject to exposure by a lamp. The temperature rise of the coating is highest in black image areas and the coating there is arranged to melt so as to produce porous regions corresponding to the image of the original and thus the stencil can be used on a duplicating machine as in the other process described to produce duplicate copies. This latter process has shortcomings in that the resolution is poor and it is blind to many colours of the original, including some blacks. The process is very quick, the exposure time being of the order of 10 seconds, but it requires practice and skill to determine the length of exposure. There is also a risk of damage to the original.

According to the present invention a method of producing a duplicating stencil comprises placing an ink-impervious surface layer of a stencil sheet in contact with an electrostatically produced image on a substrate, passing the stencil sheet and substrate through a fusing stage such that the image, in addition to being bonded to the substrate, is bonded to the said surface layer, and subsequently separating the stencil sheet from the substrate so as to remove the surface layer from the stencil sheet in the image regions.

The stencil sheet may comprise an open support structure such as the conventional porous tissue, the ink-impervious layer being carried on the surface of the support structure. The surface layer which is impervious to ink or other printing media may be composed of wax, plastics or the like but preferably comprises a synthetic resin composition in which a finely-divided pigment is dispersed.

It will be appreciated that in order to get best results with the process it is necessary to have the correct relationship between the strength of the bond securing the surface layer to the base material of the stencil sheet and the strength of the bond formed between the electrostatic image material and the surface layer. The latter is determined partly by the composition of the image material and the surface layer and partly by the conditions of pressure, temperature and time in the fusing stage which may comprise the application of heat, pressure, or a combination of both. The electrostatic image material, usually called "toner", is commonly a dry powder which is applied to the electrostatic latent image and subsequently fixed in place by heat or pressure. The preferred toner for use in the present process is a heat-fusible material which may in some cases be fixed by cold pressure instead of by heating but which can be fused by heating to form a bond with the surface layer of the stencil sheet. The heat-fusible tone may be of a known type comprising a mixture of carbon, iron oxide, and a synthetic resin, the latter being the fusible component.

Naturally, better results can be achieved if the composition of the ink-impervious surface layer of the stencil sheet is chosen to match the particular toner used in forming the electrostatic image. It is also important that this surface layer breaks cleanly, at the edges of the image areas and the loading of a synthetic resin composition with a powdered pigment aids the formation of a clean break which will give sharp definition to the finished stencil.

To control the bond strength between the surface layer and the base material of the stencil sheet it is preferred to attach the surfae layer by means of an adhesive.

The fusing stage in which the electrostatic image is bonded to the surface layer of the stencil sheet may be subsequent to the fixing of the image on the substrate or may be combined with the fixing of the toner powder to the substrate in a single stop.

The invention will now be described in more detail with the aid of examples illustrated in the accompanying diagrammatic drawings, in which.

Figure 1:
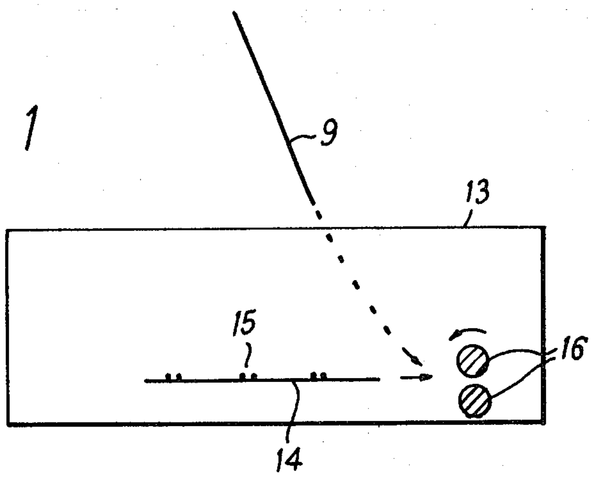
FIG. 1 shows schematically the introduction of a stencil into a convention electrostatic copying meachine which is modified to allow passage of the stencil through the fusing stage of the machine to fuse the image simultaneously to the substrate and to the surface layer of the stencil.
Figure 2:
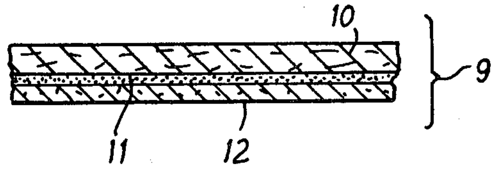
FIG. 2 is a cross-section of the form of stencil blank which can be employed.
Figure 3:
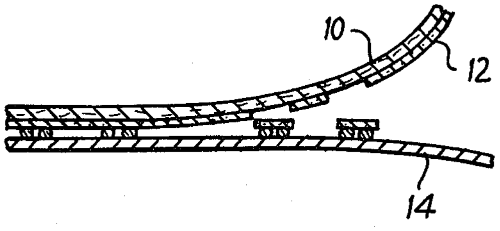
FIG. 3 shows diagrammatically the separation of the stencil from the image-bearing substrate.

In the embodiment illustrated in FIGS. 1 to 3 a stencil sheet or blank 9 comprises a base sheet 10 of porous tissue to which is bonded, by means of an adhesive film 11, an ink-impermeable surface layer 12. The thicknesses shown in FIG. 2 are not, of course, to scale and in FIG. 3 the adhesive film 11 has not been shown becuase it is of very small thickness. As shown diagrammatically in FIG. 1 an electrostatic copier 13 is modified to allow the introduction of the stencil 10 into the machine before the copy paper 14 has had the regions 15 of toner powder fused thereto. The means for introducing the stencil into the electrostatic copier must be such that the coated ink-impermeable layer 12 is facing the side of copy paper 14 which carries the tone material so that once the stencil has been placed in position a set of rollers or other pick-up means feeds the copy 14 and the stencil 10 simultaneously through a pair of rollers 16 which apply heat and/or pressure to fuse the toner region 15 both to the copy paper 14 and to the surface of layer 12 of stencil 10. The electrostatic copier whilst being otherwise of standard design would thus have an additional facility for producing stencils. Stencil blanks could, for example, be stored inside or outside the machine in a cartridge storage facility.

The copy paper 14 and stencil 10 emerge from a slot, not shown, in the end of the copier 13 and as illustrated diagrammatically in FIG. 3 separation of the copy and stencil by pulling apart produces perforations in the impermeable surface layer 12. These perforations correspond to the regions of toner on the electrostatic copy and there is thus produced quickly and cleanly a stencil which when used on a duplicating machine produces sharp images having a very fine resolution. The stencil is no less sensitive to colours than the electrostatic copier and the development or perforation energy is produced by the operator in peeling apart the sheets. No solvents are required and the dirt and odour of previous solutions are avoided.

Figure 4:
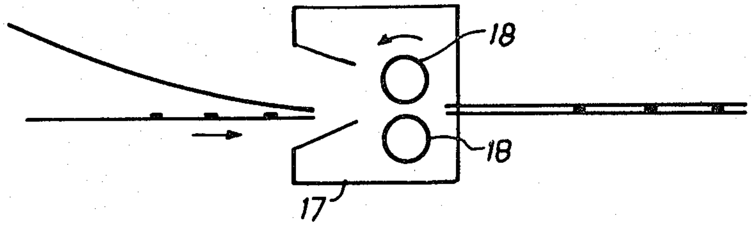
FIG. 4 shows schematically an alternative method in accordance with the invention for producing a stencil.

In the embodiment shown in FIG. 4 the stencil is applied to a copy wherein the toner image has already been fused. The two sheets are placed together as before and fed through a further separate fuser unit 17 between two rollers 18 such that the two sheets are bonded or fused together as in the first embodiment. Separation of the two sheets, as before, produces a stencil for use in a duplicating machine. The fusing stage in both embodiments is one which is appropriate to the toner material and non-ink permeable layer and may use heat or pressure or a combination of both heat and pressure applied by means of heated rollers.

As has been described with reference to FIG. 2 the stencil blank comprises a sheet of porous tissue, an ink-impermeable surface layer, and an adhesive film securing the surface layer to the tissue. The tissue can be a conventional stencil tissue such as Yoshino Type 602 Standard stencil tissue.

The ink-impervious layer comprises a suspension of a finely divided pigment in a resin binder. The ratio of pigment to binder can vary from 3:1 to 12:1. Suitable pigments include zinc oxide, zinc sulphide, carbon black, titanium diozide, china clay, talc. A range of resins can be used which includes acrylics, polyurethanes, polyvinylchlorides, cellulose esters, vinyl acetates, etc. Mixtures of different pigments and resins may be used to produce a layer which bonds firmly to the toner image of the electrostatically produces master copy. The resin constitutes the ink-impervious film. It also acts as an adhesive to bind the pigments and to form a bond with the toner image. The pigment assists the bonding of the toner and interrupts the continuity of the resin film allowing the layer to break rather than stretch during the separation of the bonded sheets thus producing the perforation mechanism. The preferred pigment is zinc oxide. The suspension of pigments in resins is prepared by millin e.g. ballmilling, for a long time so that a small particle size is obtained which is preferred as this tends to improve sharpness of the perforated stencil.

A dye such as Rose Bengal, Crystal Violet, Methylene Blue, Malachite Green, etc. is included in the milled suspension to improve the visual appearance of the perforated stencil. The prepared suspension is coated onto a casting paper or a release paper to give a dry coating weight of 20–35 gsm. The degree of release is selected so that the cast layer remains bonded to the paper and can only be delaminated once adhered to the tissue.

The function of the adhesive is to laminate the ink-impervious layer to the tissue but it must selectively release the regions of the layer that have been bonded to the electrostatically produced image on the substrate. Thus the bond strength of the adhesive must be sufficient to provide good lamination to the tissue allowing multiple copies to be taken on the duplicator without stencil damage but must be sufficiently weak to be overcome by the bond between the layer and the image on the substrate. Various types of adhesive resins can be used such as polyvinylacetates, cellulose derivatives, acyrlic emulsions, etc. The bond formed between the tissue and the layer depends on the type of adhesive selected but this may be a dry-bond, pressure or heat-sensitive bond. The adhesive is applied to the ink-impervious layer, which has been previously coated onto the release paper, and the tissue is laminated to the adhesive layer in its wet or dry state depending on the type of adhesive employed. The quantity of adhesive applied is that which provides the correct bond strength when tested.

The above laminate forms the stencil blank which may now be stripped from the release paper or retained on the release paper depending on the particular stencil format required.

The electrostatic image used with the stencil blank in the process of the invention may be produced by direct or indirect electro-photography. The imaging processes, which are well-known, involve producing a latent electrostatic image on a substrate and then developing the latent image with a toner powder and fixing to produce a visible, stable, image. Various types of toner are used, and for the present process a dry heat-fixed toner with a melting point in the range of 80° to 150° C. is preferred. For example a one component, magnetic heat-fix toner can be applied to the latent image by means of a magnetic roller.

The fusing stage in which the electrostatic image is bonded to the surface layer of the stencil blank is preferably carried out using infra-red heating because in this way radiation is preferentially absorbed by the black areas of the electrostatic master copy thus providing maximum heat in the image areas where bonding is required.

The following are more detailed examples of the process in accordance with the invention:

EXAMPLE I

The stencil sheet was manufactured as follows:

A finely divided suspension of pigment in binder resin was prepared by taking 200 parts by weight zinc oxide (Durham 100, from Durham Chemicals), 66 parts by weight of 50% solution of an acrylic resin in xylene (QR451 from Rohm & Hass), 100 parts by weight columns toluene, mixing and ballmixing for 16 hours. The suspension was coated onto casting paper (Multithane 700 from Wiggins Teape) to a dry coating weight of 24 g/m$^2$. The dry cast layer was over-coated with an aqueous, pressure-sensitive adhesive layer (Revertex A312 from Harco Chemicals) and the water dried off. Yoshino tissue was applied by a laminating roller providing sufficent pressure to give firm adhesion.

A copy of the original was taken on a Roneo Vickers Type DB6 electrostatic copier which uses a zinc oxide copy paper and a one component, magnetic toner powder. The toner used was a mixture of carbon black, iron oxide as a magnetic pigment, and a thermoplastic acrylic resin Synocryl 4003 available from Cray Valley Products. The resin has a melting range of 95° to 130° C. The image was pre-fixed by cold pressure to the copy paper.

The imaged sheet was placed in contact with the surface layer of the stencil blank and the combination passed through an external fusing unit containing a 500 watt infrared source in a pyrex glass cylinder with the imaged side of the sheet towards the source.

The bonded composite was mounted on a Roneo Vickers Type 870 Diplicator and the copy paper peeled back. The stencil thus produces gave satisfactory duplicating performance. The duplicated copies had good definition and the stencil produces long runs.

EXAMPLE II

As in example I, except that the surface layer of the stencil blank comprised 240 parts by weight zinc oxide (Durham 100), 50 parts by weight 30% solution of polyurethane in toluene/Xylene/Isopropyl alcohol (Witcote 344 from Witco Chemicals), 75 parts by weight 20% solution of cellulose ester in Toluene/Industrial Methylated Spirits (CAB 381-0.5, from Eastman Kodak), 35 parts by weight 1% solution of crystal violet in Industrial Methylated Spirits and 130 parts by weight toluene.

EXAMPLE III

As in Example I except that the adhesive used to bond the surface layer to the Yoshino tissue was an aqueous suspension of a polyvinyl acetate (Monarch D.1245 from Monarch Adhesives). The adhesive was applied to the cast layer and the tissue laminated to the wet adhesive. The composite was then dried.

EXAMPLE IV

As in Example I except that the milled suspension is coated onto a release paper (Quicklease 30/104 from Jointine). The laminated stencil blank is supplied on the release paper which also acts as a backing sheet to assist the handling of the stencil.

EXAMPLE V

As in Example I except that the copy of the original used to bond to the surface layer of the stencil was made on a U-Bix Mk I plain paper copier, the toner being pre-fixed by heated rollers.

I claim:

1. A stencil assembly for use in the formation of duplicating stencils by thermal bonding of an ink-impermeable layer of a master to an electrophotographic image attached to a substrate and subsequent separation of the substrate and the master such that the image carries away parts of the ink-impermeable layer, said stencil assembly comprising
   (a) a porous base layer,
   (b) an ink-impermeable layer,
   (c) a layer of adhesive detachably attaching said ink-impermeable layer to said base layer,
   (d) said ink-impermeable layer comprising
      (1) a synthetic resin composition rendered frangible by inclusion therein in suspension of finely divided zinc oxide dispersed throughout said synthetic resin composition.

2. A stencil assembly according to claim 1 in which the ratio of zinc oxide to synthetic resin is between 3 to 1 and 12 to 1.

3. A stencil assembly for producing a duplicating stencil wherein an ink-impervious surface layer is detachably bonded with the aid of an adhesive to a porous base layer, said ink-impervious layer comprising a synthetic resin rendered frangible by incorporation in suspension therein of a finely-dispersed zinc oxide, and wherein the ink-impervious surface layer is fused with an electrostatically-produced image on a substrate layer, said image being bonded to the substrate layer and to the ink-impervious layer.

4. A stencil assembly according to claim 3 in which the ratio of zinc oxide to synthetic resin is between 3 to 1 and 12 to 1.

* * * * *

UNITED STATES PATENT AND TRADEMARK OFFICE
CERTIFICATE OF CORRECTION

PATENT NO. : 4,434,198

DATED : February 28, 1984

INVENTOR(S) : Leslie Clark

It is certified that error appears in the above—identified patent and that said Letters Patent is hereby corrected as shown below:

On the title page of the patent, after legend [75], joint inventors should be added as follows:

[75] Leslie Clark, Newcastle upon Tyne, England;
--Rodney Francis Jude, Chigwell, Essex, England;
John Phillip Murphy, Brentwood, Essex, England;
Murray Figov, Ilford, Essex, England--

Signed and Sealed this

*Eighth* Day of *October 1985*

[SEAL]

*Attest:*

DONALD J. QUIGG

*Attesting Officer*

*Commissioner of Patents and Trademarks—Designate*